«12» United States Patent
Cermak

(10) Patent No.: US 6,928,712 B2
(45) Date of Patent: Aug. 16, 2005

(54) DRIVESHAFT AND METHOD AND DEVICE FOR PRODUCING SAME

(75) Inventor: Herbert Cermak, Bessenbach (DE)

(73) Assignee: GKN Driveline Deutschland GmbH (DE)

( * ) Notice: Subject to any disclaimer, the term of this patent is extended or adjusted under 35 U.S.C. 154(b) by 0 days.

(21) Appl. No.: 10/734,989

(22) Filed: Dec. 12, 2003

(65) Prior Publication Data

US 2004/0162150 A1 Aug. 19, 2004

(30) Foreign Application Priority Data

Dec. 13, 2002 (DE) .......................................... 102 58 381

(51) Int. Cl.$^7$ ................................................. B23P 11/00
(52) U.S. Cl. ..................... 29/428; 29/407.09; 29/407.1; 29/469; 464/182; 33/606; 228/131
(58) Field of Search ........................... 29/407.09, 407.1, 29/428, 434, 469; 464/180, 182, 183; 33/606; 228/131

(56) References Cited

U.S. PATENT DOCUMENTS

| 1,958,982 | A | * | 5/1934 | Wintercorn ................. 464/180 |
| 4,792,320 | A | * | 12/1988 | Nickel ........................ 464/181 |
| 4,868,762 | A | * | 9/1989 | Grim et al. ................. 700/279 |
| 5,195,930 | A | * | 3/1993 | Hirano et al. .............. 464/180 |
| 5,234,378 | A | * | 8/1993 | Helgesen et al. ........... 464/180 |
| 5,914,058 | A | * | 6/1999 | Sanders et al. ........ 219/121.45 |
| 5,981,921 | A | * | 11/1999 | Yablochnikov ............. 219/603 |
| 6,102,807 | A | * | 8/2000 | Barrett et al. ............... 464/180 |
| 6,364,780 | B1 | | 4/2002 | Amborn et al. |
| 6,655,208 | B1 | * | 12/2003 | McClanahan ................. 73/462 |
| 6,773,354 | B2 | * | 8/2004 | Marriott et al. ............. 464/127 |
| 6,792,660 | B1 | * | 9/2004 | Breese ..................... 29/407.05 |
| 6,813,973 | B1 | * | 11/2004 | Perry ........................... 74/607 |
| 6,826,817 | B1 | * | 12/2004 | Rapp ........................... 29/428 |
| 6,855,061 | B2 | * | 2/2005 | Simboli ....................... 464/182 |
| 2003/0207715 | A1 | * | 11/2003 | Sugiyama et al. .......... 464/182 |

FOREIGN PATENT DOCUMENTS

| DE | 35 09 306 A1 | 9/1986 |
| DE | 35 10 091 C2 | 3/1996 |

* cited by examiner

Primary Examiner—Essama Omgba

(57) ABSTRACT

A method and apparatus for assembling a driveshaft, and the driveshaft itself. The driveshaft (1) includes a first attachable part (2) with a first longitudinal axis ($A_1$), a second attachable part (3) with a second longitudinal axis ($A_2$) as well as a tube element (4) with a curvature which is production-caused. For joining purposes, the tube element (4) is held so as to intersect a reference axis (R) in two points of its center line (M). The first attachable part (2) with its first longitudinal axis ($A_1$) and the second attachable part (3) with its second longitudinal axis ($A_2$) are aligned on the reference axis (R). Thereafter, the attachable parts (2, 3) are welded to the tube ends of the tube element (4), with the radial gaps between the tube element (4) and the attachable parts (2, 3) being closed.

8 Claims, 5 Drawing Sheets

DRIVESHAFT AND METHOD AND DEVICE FOR PRODUCING SAME

BACKGROUND OF THE INVENTION

The invention relates to a process and a device for assembling a driveshaft, and to the driveshaft itself which includes a first attachable part with a first longitudinal axis, a second attachable part with a second longitudinal axis and a tube element with a curvature resulting from production-inaccuracies.

BACKGROUND OF THE INVENTION

U.S. Pat. No. 6,364,780 proposes a process of assembling a driveshaft from a first attachable part, a second attachable part and a tube element. Each of the two attachable parts includes a cylindrical receiving face whose outer diameter is smaller than the inner diameter of the tube element. For connecting the three components, the attachable parts and the tube element are aligned independently of one another on a reference axis while partially overlapping, and are then welded to one another. It is assumed that straight tube elements are available. Any curvature of the tube element resulting from its production is not taken into account.

DE 35 10 091 C2 describes a driveshaft for motor vehicles, having a tube and two attachable elements. The attachable elements are provided in the form of universal joints which are inserted into the ends of the tube and connected thereto by welding. The attachable elements each comprise a portion with a reduced diameter which is introduced into the tube, as well as a shoulder which rests against the associated end of the tube in order, thus, to achieve accurate positioning. After the attachable element has been inserted into the tube, the two components are aligned relative to one another in a defined way.

From DE 35 09 306 A1 there is known a tube assembly, more particularly a driveshaft/joint head assembly as well as a method of producing same. The tube assembly comprises a driveshaft and a joint head coaxially welded on to same. The end of the driveshaft is thickened towards the joint head, with its inner circumference being toleranced in such a way that, in the assembled condition, a sliding fit is achieved between the driveshaft and the joint head. After the two components have been made to contact one another by means of their conical faces and thus have assumed a defined position relative to one another, they are welded to one another.

SUMMARY OF THE INVENTION

The present invention provides a device for assembling a driveshaft as well as the driveshaft itself which comprises a first attachable part, a second attachable part and a tube element with a production-caused curvature. After assembly, the present driveshaft has only a minimum amount of out-of-balance. In other words, the out-of-balance characteristic normally resulting from the curved tube element is minimized.

In accordance with one embodiment of the invention, a process is provided for assembling a driveshaft comprising a first attachable part with a first longitudinal axis and a first cylindrical receiving face; a second attachable part with a second longitudinal axis and a second cylindrical receiving face; as well as a tube element with a production-caused curvature and a curved center line and a given length (L) comprising a tube wall, a first tube end and a second tube end. Between the tube wall and the receiving faces of the attachable parts, there are provided radial gaps. The process comprises the following process stages: the tube element is held with two points of its center line on a reference axis; the first attachable part is held with its first longitudinal axis on the reference axis, with the first attachable part and the tubular part partially overlapping; the second attachable part is held with its second longitudinal axis on the reference axis, with the second attachable part and the tube element partially overlapping; the first attachable part and the second attachable part are each welded to the tube ends of the tube element, with the radial gaps being closed.

This process of assembling a driveshaft is advantageous in that the production-related out-of-balance of the tube element, which out-of-balance results from the production-caused curvature, can be largely taken into account during the operation of joining the attachable parts by applying a simple approaching method. This approaching method results from qualitatively causing the main inertia axis of the tube element to approach the axis of rotation of the finished shaft prior to the joining operation. In this way, it is possible to ensure that the driveshaft thus produced comprises a minimum amount of residual out-of-balance, and there is no need for expensive aligning or subsequent machining operations.

According to an advantageous embodiment of the inventive process, the tube element is aligned relative to the reference axis in such a way that the ratio of the distance between the points of intersection of the center line with the reference axis relative to the length of the tube element ranges between 0.5 and 0.75. With such an alignment, the main inertia axis of the tube element curved in a standard way is positioned close to the reference axis, so that only a minimum amount of out-of-balance in the driveshaft results. The tube element can be aligned relative to the reference axis in such a way that the points of intersection are positioned axially symmetrically between the points where the attachable elements are joined.

According to a further embodiment of the process in accordance with the invention, with the tube element being held with two points of its center line on the reference axis, the radial gaps between the receiving faces of the attachable parts and the tube wall, in respect of magnitude, are greater than the axial distance between the reference axis and an axis extending centrally through the tube openings at the tube ends.

The welds can be produced by laser or plasma welding, such processes being particularly suitable for bridging large gap widths. For accelerating the welding process it is advantageous to produce the welds in several places simultaneously, starting by producing an arched shape along the annular gaps between the tube wall and the cylindrical receiving faces of the attachable parts. To avoid any tension-related torsion, the welds should be produced in two diametrically opposed places simultaneously.

Furthermore, the invention provides a driveshaft comprising a first attachable part with a first longitudinal axis, a second attachable part with a second longitudinal axis as well as a tube element with a production-caused curvature and a curved center line. The first attachable part with its first longitudinal axis on a reference axis, the second attachable part with its second longitudinal axis on the reference axis and the tube element with its center line intersecting the reference axis in two points, are aligned relative to one another and arranged so as to partially axially overlap, and are connected to one another by welds. The driveshaft is advantageous in that the production-related out-of-balance of the tube element, to the extent that it results from the production-caused curvature of the tube element, can already be largely taken into account during the operation of joining the attachable parts, so that any amount of out-of-balance which remains is minimized to be within a permissible tolerance range.

In a further embodiment, the first attachable part or the second attachable part, or both, comprise an outer receiving face with an outer diameter which is smaller than the inner diameter of the tube element. In an alternative embodiment, the first attachable part or the second attachable part, or both, comprise an inner receiving face with an inner diameter which is greater than the outer diameter of the tube element.

A further solution provides a device for assembling a driveshaft having a first attachable part with a first longitudinal axis, a second attachable part with a second longitudinal axis and a tube element with a production-caused curvature and a curved center line and a given length. The device includes a first holding element for coaxially holding the first attachable part with its first longitudinal axis on a reference axis, a second holding element for coaxially holding the second attachable part with its second longitudinal axis on the reference axis, as well as tensioning elements for holding the tube element with two points of its central line (M) on the reference axis, wherein the two tensioning elements are arranged between the two holding elements. This device allows production-related out-of-balance of the tube element, to the extent that it results from its production-related curvature, to be largely corrected by joining the attachable parts to the tube element, so that there remains only a minimum amount of out-of-balance.

According to an advantageous embodiment, the tensioning elements are arranged at a distance from one another which is greater than 0.5 times, and smaller than 0.75 times, the length of the tube element. A particularly advantageous embodiment is obtained if the tensioning elements are arranged at a distance from one another which amounts to 0.577 times the length of the tube element. In this way, it is ensured that the tube element, by means of its main inertia axis, is made to approach, and to be aligned with, the later axis of rotation of the driveshaft, so that the residual out-of-balance is reduced considerably.

In one embodiment, the tensioning elements each comprise three jaws which are arranged at the same distance from one another and from the reference axis. The jaws are radially displaceable relative to the reference axis to allow the tube element to be clamped in. According to an advantageous embodiment, the jaws are roller-shaped and are positioned on axes extending parallel to the reference axis. In this way it is ensured that, in a cross-sectional view, the tube element can be accurately held on the reference axis in three supporting points. The tensioning elements are preferably axially displaceable in order to ensure that, within the region of adjustment, they can be adapted to the different curvatures of the tube element.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION OF THE DRAWINGS

Figure 1:
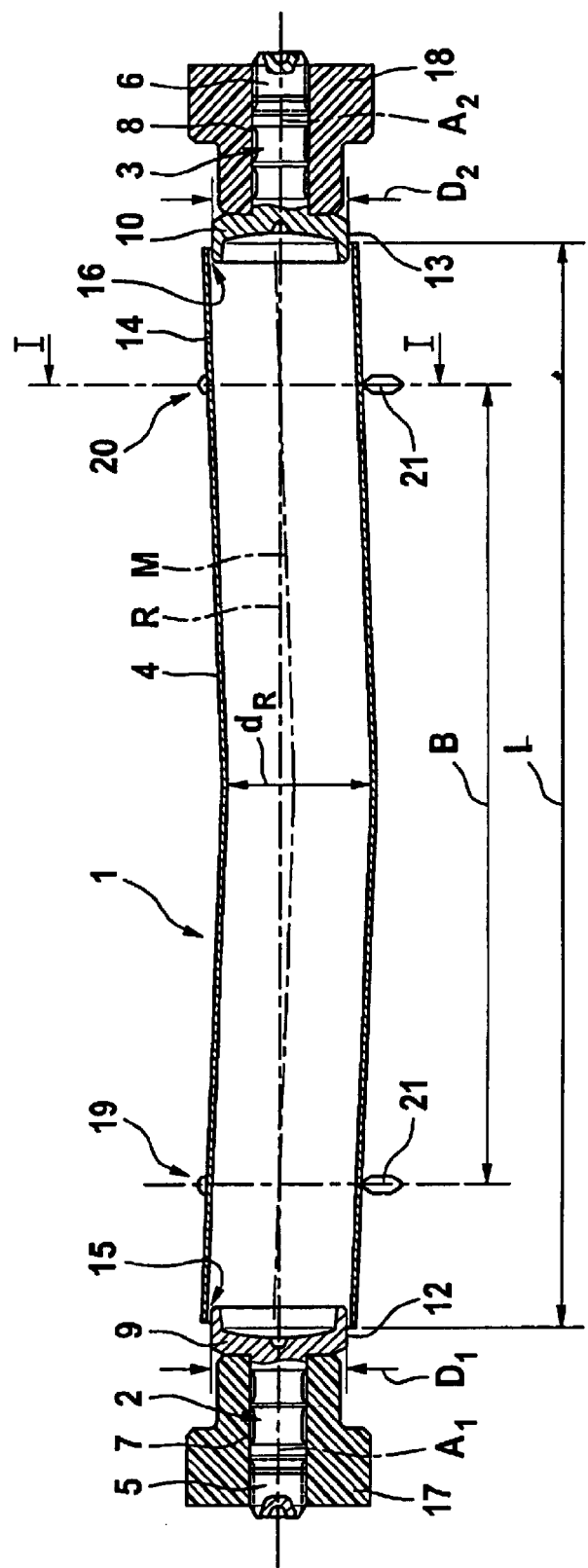
FIG. 1 is a longitudinal section through an inventive device with a driveshaft.

FIG. 1 shows a device for assembling a driveshaft 1. The driveshaft 1 comprises a first attachable part 2, a second attachable part 3 and, for example, a tube element 4 which is curved as a result of production inaccuracies. The first and the second attachable part 2, 3 are identical; the first attachable part 2 is rotationally symmetrically designed around an individual first longitudinal axis $A_1$, and the second attachable part 3 is rotationally symmetrically designed around an individual second longitudinal axis $A_2$. Both attachable parts 2, 3 comprise a journal portion 5, 6 with a toothing 7, 8 for transmitting torque, and a connecting portion 9, 10 which adjoins the journal portion 5, 6 and which provides a connection with the tube element 4. The connecting portions 9, 10 each comprise a cylindrical receiving face 12, 13 whose outer diameter $D_1$, $D_2$ is smaller than the inner diameter $d_R$ of the ends of the tube element. In this way, with the attaching parts 2, 3 partially inserted into the tube element 4, there exist radial gaps 15, 16 between the tube wall and the respective receiving faces 12, 13, as a result of which it is possible, to a limited extent, to achieve mutual radial alignment of the components relative to one another.

The device comprises a first holding element 17 for positioning the first attachable part 2, a second holding element 18 for positioning the second attachable part 3, as well as two tensioning elements 19, 20 for positioning the tube element 4. During assembly, the individual components of the driveshaft 1 are first aligned relative to one another and then welded to one another. To ensure axial overlapping with the tube element 4, the two attachable parts 2, 3 can be displaced relative to one another to a predetermined dimension.

To allow the radial alignment of the three components of the driveshaft relative to one another it is desirable for the tensioning elements 19, 20 and the holding elements 17, 18 to axially cooperate with one another. The tube element 4 should be aligned with the attaching parts 2, 3 for the welding operation in such a way that the residual out-of-balance of the tube element 4 is minimized after welding. This is the case if the main inertia axis of the tube element is positioned as close as possible to the reference axis R which extends through the centers formed by tensioning elements 19, 20 and relative to which the two attachable parts 2, 3 with their longitudinal axes $A_1$, $A_2$ are aligned.

To achieve this, the tube element 4 with its center line M, which is defined by the sum of the centers of the axially adjoining cross-sections, is aligned relative to the attachable parts 2, 3 in such a way that it intersects the reference axis R in two points. The two tensioning elements 19, 20 are arranged at identical distances from a central plane of the tube element 4, which central plane is positioned perpendicularly on the reference axis R, and at a distance B from one another. The ratio between the distance B and the tube length L ranges between 0.5 and 0.75, and advantageously, it is 0.577. As a result of the curvature of the tube element 4, such an alignment ensures that the tube ends are offset from the reference axis R and are thus not positioned coaxially relative to the attachable parts 2, 3. To balance the radial offset, the inner diameter $d_R$ of the tube element and the outer diameters $D_1$, $D_2$ of the attachable parts 2, 3 at their receiving faces 12, 13 are dimensioned in such a way that radial gaps 15, 16 are formed between the components. These have to be large enough for balancing the offset of the reference axis R relative to an axis which extends centrally through the ends of the tube element 4.

The two tensioning elements 19, 20 are axially displaceable, so that, within the region of adjustment, they can be adapted to different curvatures of different tube elements 4. It is thus possible to make the main inertia axis (not illustrated) of the tube element 4 approach the reference axis R which, at a later stage, forms the axis of rotation of the driveshaft, so that the amount of out-of-balance remaining in the driveshaft is reduced to a minimum.

Figure 2:
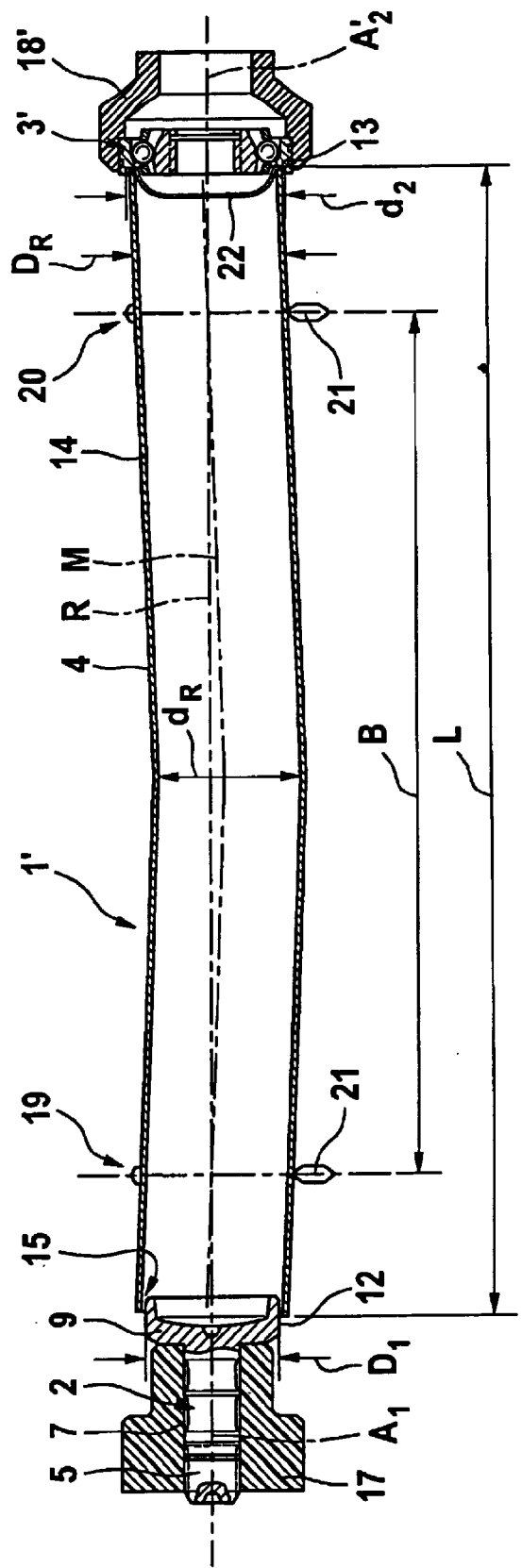
FIG. 2 is a longitudinal section through a device according to FIG. 1 with a second driveshaft embodiment.

In contrast to the driveshaft according to FIG. 1, the driveshaft according to FIG. 2 comprises a first attachable part 2 in the form of a journal part and a second attachable part 3' in the form of a constant velocity joint provided for torque transmitting purposes. The inner diameter $d_2$ of the aperture at the joint is greater than the outer diameter $D_R$ of the tube element 4 at its tube end, so that, with the tube element 4 partially inserted into the aperture, there is formed a radial gap between the two components. In the aperture of the outer joint part, there is arranged a cover 22 which is in contact with the shoulder of the outer joint part and serves to seal the joint chamber. In this way, lubricant is prevented from leaving the joint chamber.

For joining the driveshaft 1', the second attachable part 3' at the outer joint part is clamped into the second holding element 18', with the outer joint part with its longitudinal axis $A_2$' being aligned on the reference axis R. As a result of the radial gap between the tube element 4 and the cylindrical receiving face 13 of the outer joint part, it is possible to balance an offset, caused by the curvature of the tube element 4, between the longitudinal axis $A_2$' of the outer joint part and the axis which extends centrally through the two tube openings at the tube ends. There are thus obtained the advantages already described above.

Figure 3:
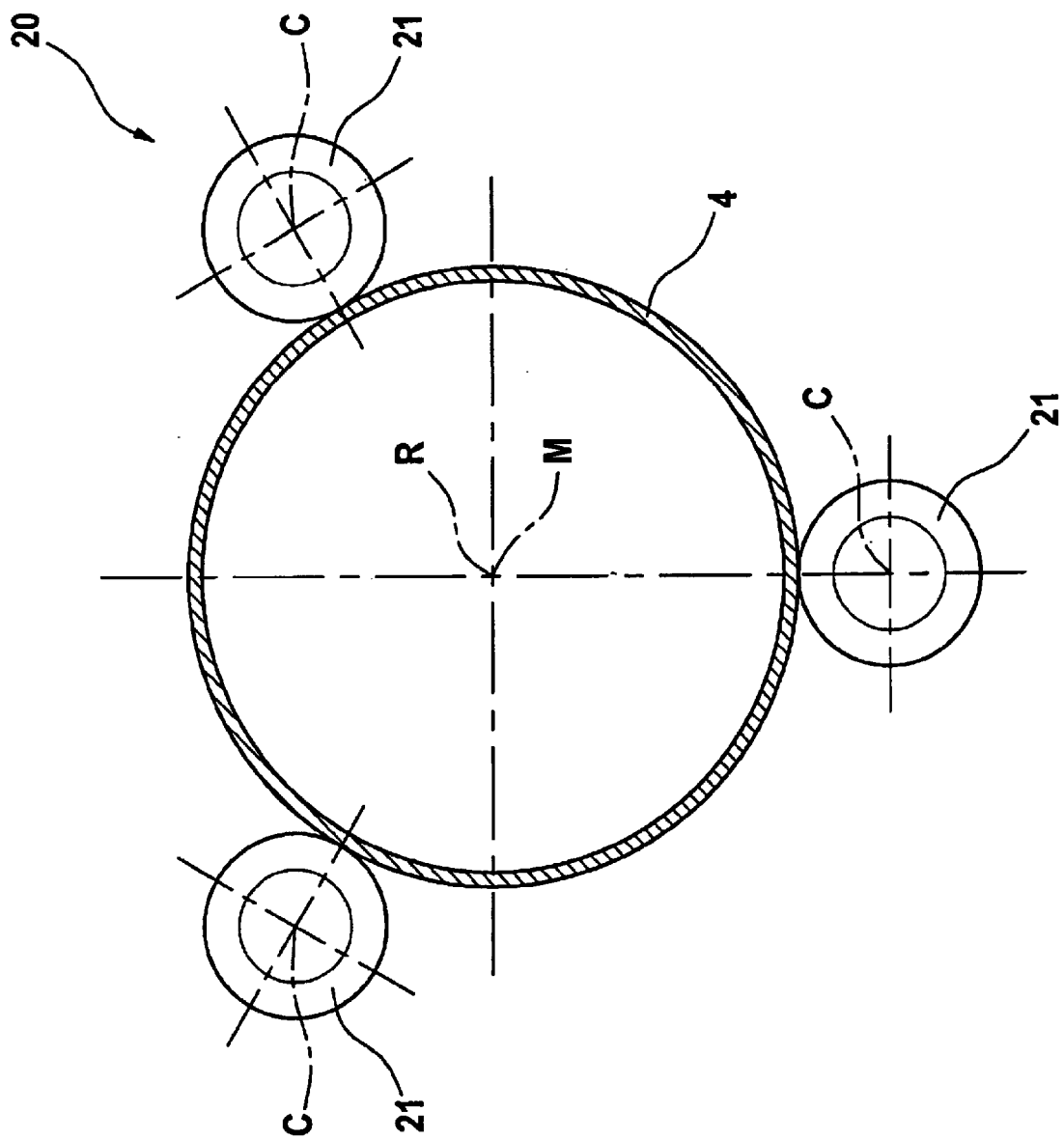
FIG. 3 shows a tensioning element along sectional line I—I of FIG. 1.

FIG. 3, by way of example, shows one of the two tensioning elements 19, 20 in a cross-sectional view. It comprises three roller-shaped jaws 21 which are arranged in a plane extending perpendicularly relative to the reference axis R on parallel axes C. The axes C are arranged at identical distances from one another. For the purpose of clamping in the tube element 4, the three roller-shaped jaws 21 can be displaced radially relative to the reference axis R. In this way, the tube element 4 is held in the plane of the jaws 21 in such a way that its center line M intersects the reference axis R.

After the attachable parts and the tube element have been aligned relative to one another, the three components are welded to one another. Suitable welding processes are those which are able to bridge a gap and cause little distortion, such as laser or plasma welding. The welds can be produced in two diametrically opposed places to keep heat distortion to a minimum. During the welding operation, a relative rotational movement around the reference axis R takes place between the welding tool and the device for holding the driveshaft 1, with the weld being produced so as to be arch-like along the radial gaps 15, 16 between the tube wall 14 and the cylindrical receiving faces 12, 13.

Figure 4:
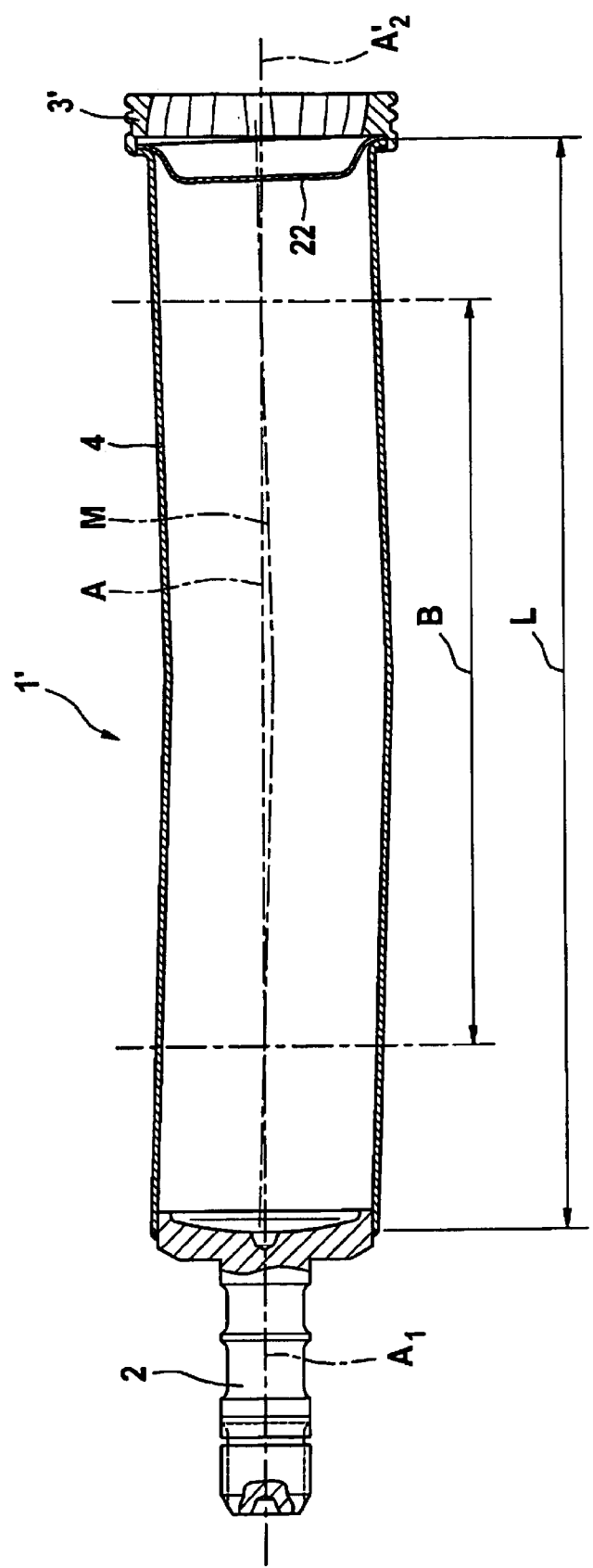
FIG. 4 shows a driveshaft produced in accordance with one embodiment of the inventive process.

FIG. 4 shows a driveshaft 1' after the welding process in accordance with the invention has been carried out. The driveshaft 1' comprises a first attachable part 2 and a second attachable part 3' in the form of an outer joint part. It can be seen that the previous separate longitudinal axes $A_1$, $A_2$' of the attachable parts 2, 3' now coincide and form the common axis of rotation A of the driveshaft. The tube element 4 is aligned with its center line M relative to the attachable parts 2, 3' so as to intersect the axis of rotation A in two points. The distance B between the two points of intersection, relative to the tube length L, amounts to approximately 0.577. In this way, the main inertia axis (not illustrated) and the center of gravity of the tube element 4 have approached the rotational axis A, so that the driveshaft 1' produced in such way has only a minimum amount of residual out-of-balance.

Figure 5:
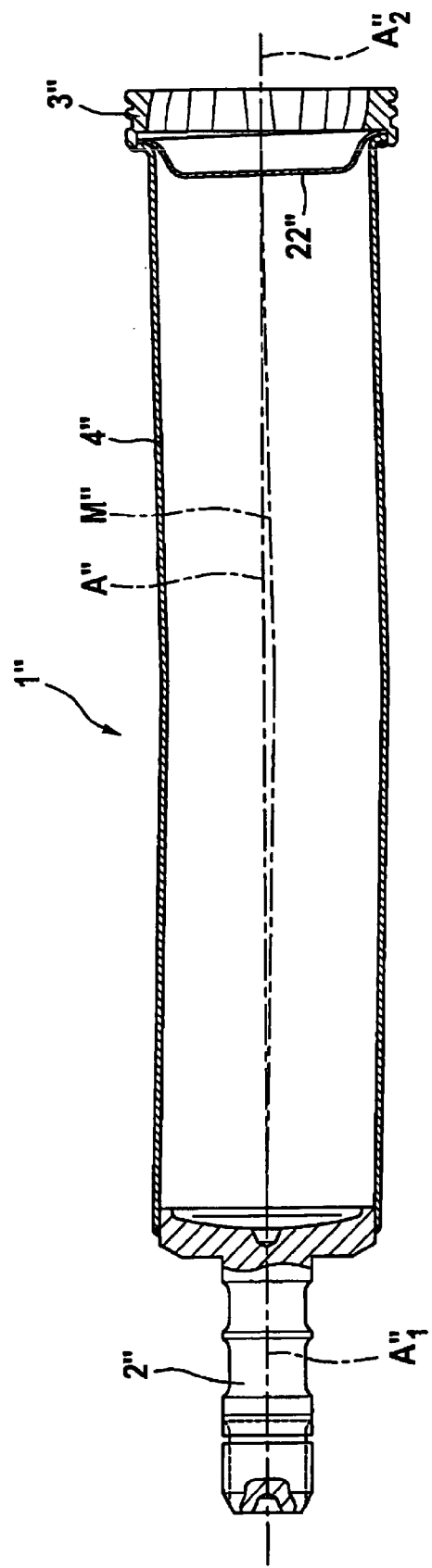
FIG. 5 shows a driveshaft according to the state of the art.

On the other hand, the tube element 4" of the driveshaft 1" in accordance with the state of the art, as shown in FIG. 5, by means of its two ends, is aligned centrally on the longitudinal axes $A_1$", $A_2$" of the attachable elements 2", 3" and welded. The center line M" does not intersect the axis of rotation A" of the driveshaft 1" inside the length of the tube element 4", but directly at the tube ends. As a result, the center of gravity of the tube element 4" is clearly radially offset relative to the axis of rotation A" of the driveshaft, so that the out-of-balance remaining after welding is relatively great, with expensive subsequent machining being necessary to balance the shaft assembly.

In the embodiments described here, the attachable parts are partly shown as individual components, more particularly as joint components, and partly as an assembly, i.e. as a complete constant velocity joint. It should be appreciated that both possibilities form part of the subject of the present invention and that the attachable parts can also be provided in the form of larger pre-assembled units.

While the invention has been described in connection with several embodiments, it should be understood that the invention is not limited to those embodiments. Rather, the invention covers all alternatives, modifications, and equivalents as may be included in the spirit and scope of the appended claims.

What is claimed is:

1. A method of assembling a driveshaft having:
   a first attachable part with a first longitudinal axis and a first cylindrical receiving face;
   a second attachable part with a second longitudinal axis and a second cylindrical receiving face; and
   a tube element with a production-caused curvature and a curved center line and a given length, the tube element comprising a tube wall, a first tube end and a second tube end, wherein between the tube wall and the receiving faces of the attachable parts, there are provided radial gaps;

the method comprising the following steps:
   holding the tube element with two points of its center line on a reference axis;
   positioning the first attachable part with its first longitudinal axis coaxial with the reference axis, with the first attachable part and the tubular part partially overlapping;
   positioning the second attachable part with its second longitudinal axis coaxial with the reference axis, with the second attachable part and the tube element partially overlapping; and
   welding the first attachable part and the second attachable part to the tube ends of the tube element, with the radial gaps being closed.

2. A method of assembling a driveshaft having:
- a first attachment part with a first longitudinal axis and a first cylindrical receiving face;
- a second attachable part with a second longitudinal axis and a second cylindrical receiving face; and
- a tube element with a production-caused curvature and a curved center line and a given length, the tube element comprising a tube wall, a first tube end and a second tube end, wherein between the tube wall and the receiving faces of the attachable parts, there are provided radial gaps;

the method comprising the following steps:
- holding the tube element with two points of its center line on a reference axis;
- positioning the first attachable part with its first longitudinal axis on the reference axis, with the first attachable part and the tubular part partially overlapping;
- positioning the second attachable part with its second longitudinal axis on the reference axis, with the second attachable part and the tube element partially overlapping;
- welding the first attachable part and the second attachable part to the tube ends of the tube element, with the radial gaps being closed; and
- wherein the tube element is aligned relative to the reference axis in such a way that the ratio of a distance between the points of intersection of the center line with the reference axis relative to the length of the tube element ranges between approximately 0.5 and 0.75.

3. A method according to claim 2, wherein the tube element is aligned relative to the reference axis in such a way that the ratio of the distance between the points of intersection of the center line with the reference axis relative to the length of the tube element is approximately 0.577.

4. A method according to claim 2, wherein the tube element is aligned relative to the reference axis in such a way that the points of intersection of the center line with the reference axis are positioned axially symmetrically between the attachable parts.

5. A method according to claim 2, wherein the welds are produced by laser or plasma welding.

6. A method according to claim 2, wherein the welds are produced, starting in several places simultaneously, curve-like along the annular gaps between the tube wall (14) and the cylindrical receiving faces of the attachable parts.

7. A method according to claim 6, wherein the welds are produced in two diametrically opposed places simultaneously.

8. A method of assembling a driveshaft having:
- a first attachment part with a first longitudinal axis and a first cylindrical receiving face;
- a second attachable part with a second longitudinal axis and a second cylindrical receiving face; and
- a tube element with a production-caused curvature and a curved center line and a given length, the tube element comprising a tube wall, a first tube end and a second tube end, wherein between the tube wall and the receiving faces of the attachable parts, there are provided radial gaps;

the method comprising the following steps:
- holding the tube element with two points of its center line on a reference axis;
- positioning the first attachable part with its first longitudinal axis on the reference axis, with the first attachable part and the tubular part partially overlapping;
- positioning the second attachable part with its second longitudinal axis on the reference axis, with the second attachable part and the tube element partially overlapping;
- welding the first attachable part and the second attachable part to the tube ends of the tube element, with the radial gaps being closed; and
- wherein, with the tube element being held by two points of its center line on the reference axis, the radial gaps between the receiving faces of the attachable parts and the tube wall, in respect of magnitude, are greater than the axial distance between the reference axis and an axis extending centrally through tube openings at the tube ends.

* * * * *